June 30, 1931.  G. A. MITCHELL  1,812,056
DISSOLVING SHUTTER
Filed Aug. 10, 1929  2 Sheets-Sheet 1
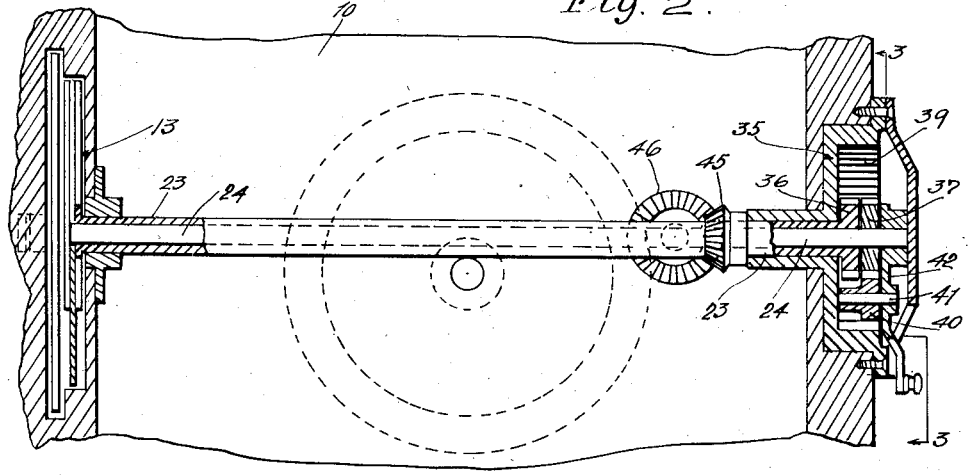
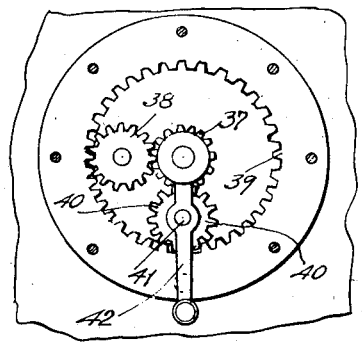
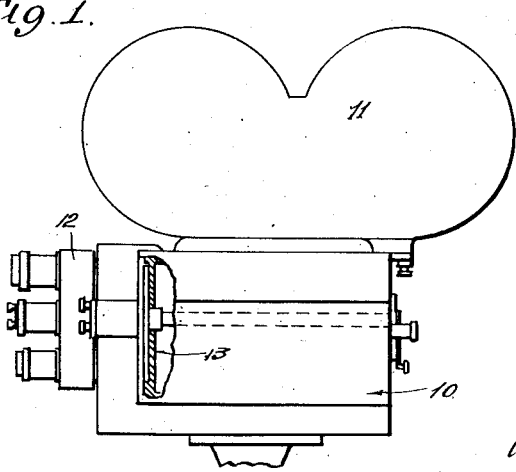
Inventor
George A. Mitchell
Attorney.

June 30, 1931. G. A. MITCHELL 1,812,056
DISSOLVING SHUTTER
Filed Aug. 10, 1929  2 Sheets-Sheet 2
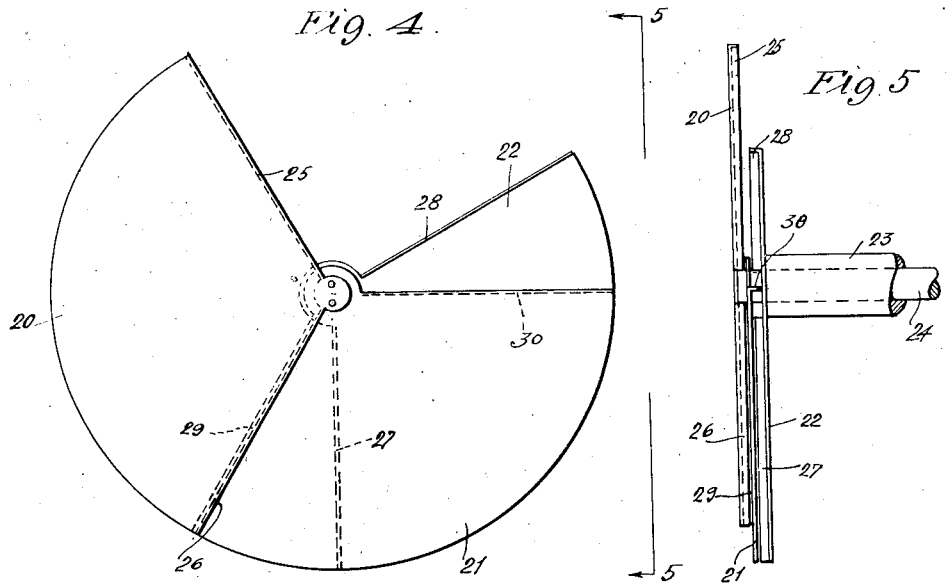
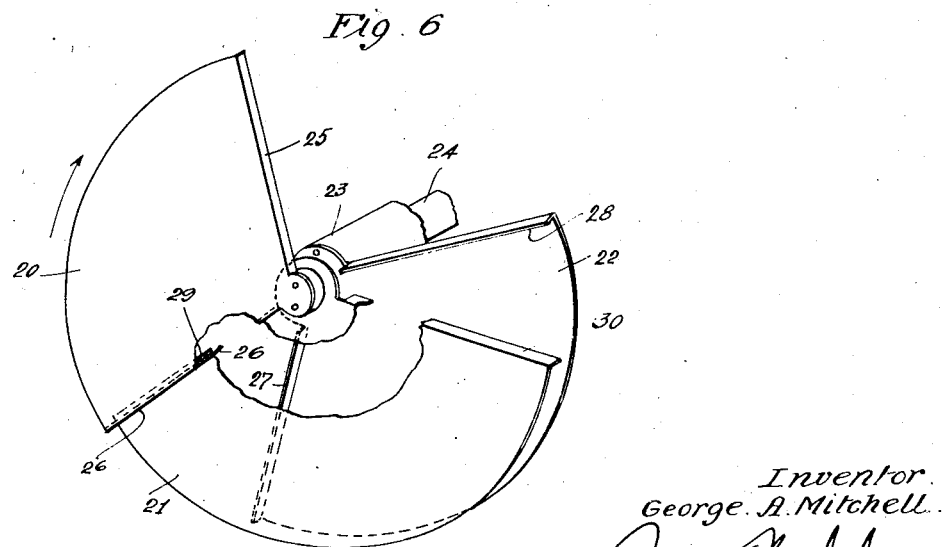
Inventor
George A. Mitchell
Attorney Patented June 30, 1931

1,812,056

UNITED STATES PATENT OFFICE

GEORGE A. MITCHELL, OF LOS ANGELES, CALIFORNIA, ASSIGNOR TO MITCHELL CAMERA CORPORATION, A CORPORATION OF DELAWARE

DISSOLVING SHUTTER

Application filed August 10, 1929. Serial No. 334,949.

This invention relates generally to motion picture cameras, and more particularly to dissolving shutters therefor.

Motion picture cameras have in the past been commonly provided with dissolving shutters, of the general type disclosed, for instance, in U. S. Patent No. 1,297,703, to J. E. Leonard. A shutter mechanism of that type embodies essentially a pair of relatively rotatable 180 degree or semi-circular shutter leaves, one mounted on a driving shaft and one mounted on a driving sleeve surrounding said shaft. The shaft and sleeve are driven together by suitable mechanism, and in normal operation are so related that the two shutter leaves are maintained in face to face register with a 180 degree opening through the shutter. The driving mechanism for the shaft and sleeve is of such a nature that when it is desired to "dissolve" the picture, the opening through the shutter can be gradually closed by relatively rotating the shaft and sleeve while the camera is in full operation, thereby causing the shutter leaves gradually to separate or unfold and finally entirely close up the shutter.

A 180 degree dissolving shutter of this type, however, is only suitable when the film is stationary through 180 degrees or less; but with the provision of faster film movement mechanism, with the use of which the film may remain stationary for as long say as 270 degrees, the shutter must be correspondingly reduced in angular size to take advantage of the speed of the film movement mechanism, as will readily be understood. And if the shutter leaves of the above described shutter arrangement were each to be reduced below 180 degrees, it would no longer be possible completely to close the shutter aperture, and therefore no longer possible to carry out a complete dissolve.

It is therefore the primary object of the present invention to provide a dissolving shutter in which the shutter opening can be increased substantially above 180 degrees.

This object I accomplish, according to my invention, by suitably reducing the angular size of each of the two usual shutter leaves, and then providing a third leaf between the two. The third or middle leaf registers with the first two (outer) leaves when the shutter is entirely open; but as the outer leaves are relatively rotated to close up the shutter opening, the trailing edge of the leading leaf picks up the forward edge of the middle leaf and drags the middle leaf behind it to advance with respect to the trailing outer leaf, and when the forward edge of the leading outer leaf finally meets the rear edge of the trailing outer leaf, the shutter is completely closed through the full 360 degrees by the three leaves.

The invention will be more fully understood from the following detailed description of a present preferred embodiment thereof, reference for this purpose being had to the accompanying drawings, in which:

Figure 1 is a side elevation of a motion picture camera with parts broken away to show the location of the shutter and dissolve mechanism;

Fig. 2 is an enlarged fragmentary view in vertical section showing the dissolving shutter and drive mechanism therefor;

Fig. 3 is a vertical section taken on line 3—3 of Fig. 2;

Fig. 4 is a vertical section taken on line 4—4 of Fig. 2, and showing the shutter in side elevation;

Fig. 5 is a view taken on line 5—5 of Fig. 4; and

Fig. 6 is a perspective view, with parts broken away, of the shutter.

Referring now to the drawings, the numeral 10 indicates a motion picture camera case supporting a film magazine 11, and upon which is mounted a lens turret 12. Mounted within the camera case is a shutter mechanism 13 which intermittently allows light to pass through the photographic lens to the film.

The shutter embodies three relatively movable leaves 20, 21 and 22, here shown as each of approximately 120 degrees in angular extent. The inner leaf 22 is mounted upon a driving sleeve 23 journalled within the camera case, the outer leaf upon a driving shaft 24 rotatably carried in sleeve 23, while the middle leaf 21 is mounted loosely around and floats on shaft 24 between the leaves 20 and 22. Leaf 20 is provided at its leading and trailing edges with rearwardly turned flanges 25 and 26, respectively (the shutter being assumed to rotate in the direction indicated by the arrow in Fig. 6); leaf 22 is provided at its leading and trailing edges with forwardly turned flanges 27 and 28, respectively; while the middle leaf 21 is provided at its leading edge with a forwardly turned flange 29 confined between flanges 25 and 26 of forward leaf 20, and at its trailing edge with a rearwardly turned flange 30 confined between the flanges 27 and 28 of the rear leaf 22.

The shutter drive mechanism may be any usual mechanism adapted to drive sleeve 23 and shaft 24 in unison, and provided with means, either manually or automatically actuated, for relatively rotating the sleeve and shaft while they are being driven. For the sake of simplicity I here show a simple differential gear drive for the sleeve and shaft which is so arranged that the sleeve and shaft may be relatively rotated manually while the camera is in operation.

The rear ends of sleeve 23 and shaft 24 terminate in a gear case 35 set in the rear wall of the camera. Sleeve 23 is fitted with a pinion 36, and shaft 24 is fitted with a pinion 37 of a diameter equal to that of pinion 36 and disposed co-axially therewith. Pinion 36 meshes with an idler gear 38, which in turn meshes with an internal gear 39. Pinion 37 meshes with an idler gear 40 also in mesh with internal gear 39. Pinion 40 is mounted upon a shaft 41 secured within a lever arm 42 extending radially from shaft 24, where it is supported by means of a bearing surrounding said shaft.

The mechanism is driven through a gear 45 on sleeve 23 meshing with a driving gear 46, gear 46 being driven by the drive mechanism of the camera, not shown.

Rotation of gear 45 by gear 46 and the camera drive mechanism drives sleeve 23, and as sleeve 23 rotates the inner shutter leaf 22 mounted thereon is uniformly and continuously rotated. Rotation of sleeve 23 transmits motion from its pinion 36 through idler 38 to internal gear 39, which is normally rotated thereby in unison with the sleeve. Internal gear 39 in turn transmits motion through idler 40 to the pinion 37 on shaft 24, thereby rotating drive shaft 24 in unison with sleeve 23. The shutter leaf 20 which is mounted on shaft 24 is thus normally driven in unison with the shutter leaf 22 on sleeve 23.

When the shutter is completely opened the three leaves are registered face to face and occupy an angular space of approximately 120 degrees. The middle leaf 21 is then confined in position relative to leaves 20 and 22 because its flanges 29 and 30 are confined between the flange 25 of leaf 20 and the flange 28 of leaf 22. There is then no relative movement between the three leaves, and the operation is as above described.

But when it is desired to close up the shutter opening for the purpose of "dissolving" the picture, the three shutter leaves are relatively moved to gradually close up the full 360 degrees of the shutter, and this may be done while the camera is in full operation, as will now be explained.

For this purpose, lever 42 is swung toward the right, as viewed in Fig. 3, which action correspondingly carries idler 40 toward the right and thereby causes it to rotate with respect to internal gear 39, and also to rotate pinion 37 with respect to internal gear 39. This action changes the relation between sleeve 23 and shaft 24, and accordingly causes the shutter leaf 20 of shaft 24 to advance relative to the shutter leaf 22 of shaft 23, thereby decreasing the shutter opening, as will be understood. As lever 42 is manipulated toward the right the trailing edge of leaf 20 finally separates from the leading edge of leaf 22, but as it does so its flange 26 engages the flange 29 of middle leaf 21 and drags the middle leaf after it and ahead of leaf 22, as is clearly indicated in Fig. 6. This operation may be continued until the shutter opening is entirely closed up, flange 30 then engaging flange 27 and flange 26 engaging flange 29 to hold the floating middle leaf in position, and flange 25 of the leading leaf contacting flange 28 of the trailing leaf to complete the closure.

When it is desired to "fade in" a picture, the reverse operation is performed, lever 42 then being swung toward the left. During this operation the opening between leaves 20 and 22 is gradually increased, the leaves finally folding together and occupying approximately 180 degrees of angular space.

It will readily be understood from what has now been said how the leaves may be made of any size and number to accommodate the speed of the film movement mechanism with which the shutter is to be used. For the sake of simplicity in the above description, I have chosen to show specifically only the case in which three equally sized shutter leaves of approximately 120 degrees each are utilized.

It will be understood the drawings and description are to be considered merely as illustrative of and not restrictive on the broader claims appended hereto, for various changes in design, structure and arrangement may be made without departing from the spirit and scope of said claims.

I claim:

1. A shutter mechanism for a motion picture camera embodying two normally overlapped shutter leaves each less than 180 degrees in angular dimension, means adapted to rotate said shutter leaves in unison, means for relatively advancing one of said leaves with respect to the other while the leaves are being rotated by said last mentioned means, and a third shutter leaf mounted between said first mentioned shutter leaves, means confining the leading edge of said third leaf to float between the leading and trailing edges of the relatively advancing leaf, and means confining the trailing edge of said third leaf to float between the leading and trailing edges of the other of said leaves.

2. A shutter mechanism for a motion picture camera embodying two normally overlapped shutter leaves each less than 180 degrees in angular dimension, means adapted to rotate said shutter leaves in unison, means for relatively advancing one of said leaves with respect to the other while the leaves are being rotated by said last mentioned means, and a third shutter leaf mounted between said first mentioned shutter leaves, a flange on each edge of the relatively advancing leaf turned toward said third leaf, a flange on the leading edge of said third leaf turned toward said relatively advancing leaf and confined between and adapted to be engaged by the flanges thereof, a flange on each edge on the other of said leaves turned toward said third leaf, and a flange on the trailing edge of said third leaf turned toward said last mentioned leaf and confined between and adapted to be engaged by the flanges thereof.

3. A shutter mechanism for a motion picture camera embodying two normally overlapped shutter leaves each less than 180 degrees in angular dimension, a rotatable sleeve having one of said shutter leaves mounted on one end thereof, a shaft rotatable within said sleeve and on which the other of said shutter leaves is mounted, means adapted to rotate said sleeve and shaft in unison, means for relatively rotating said shaft and sleeve while they are being rotated by said last mentioned means to relatively advance one of said shutter leaves with respect to the other, a third shutter leaf loosely mounted on said shaft between the two first mentioned leaves, means confining the leading edge of said third leaf to float between the leading and trailing edges of said relatively advancing leaf, and means confining the trailing edge of said third leaf to float between the leading and trailing edges of the other leaf.

4. A shutter mechanism for a motion picture camera embodying two overlapping shutter leaves each less than 180 degrees in angular dimension mounted on one axis of rotation, means for rotating said two shutter leaves either in unison or differentially, a third shutter leaf mounted on the same axis of rotation as the first two shutter leaves, means confining the leading edge of said third leaf to float between the leading and trailing edges of one of said first two leaves, and means confining the trailing edge of said third leaf to float between the leading and trailing edges of the other of said first two leaves.

5. A shutter mechanism for a motion picture camera embodying two overlapping shutter leaves each less than 180 degrees in angular dimension mounted on one axis of rotation, means for rotating said two shutter leaves either in unison or differentially, a third shutter leaf mounted on the same axis of rotation as the first two shutter leaves, a flange at each edge of each of the first two leaves turned toward the third leaf, a flange on one edge of the third leaf turned toward one of said first two leaves and confined between and adapted to be engaged by the flanges thereof, and a flange on the other edge of the third leaf turned toward the other of the first two leaves and confined between and adapted to be engaged by the flanges thereof.

In witness that I claim the foregoing I have hereunto subscribed my name this 25th day of July, 1929.

GEORGE A. MITCHELL.